(12) United States Patent
Kardos

(10) Patent No.: US 7,305,078 B2
(45) Date of Patent: Dec. 4, 2007

(54) SPEAKER IDENTIFICATION DURING TELEPHONE CONFERENCING

(75) Inventor: Christopher P. Kardos, Cedar Rapids, IA (US)

(73) Assignee: Electronic Data Systems Corporation, Plano, TX (US)

( * ) Notice: Subject to any disclaimer, the term of this patent is extended or adjusted under 35 U.S.C. 154(b) by 198 days.

(21) Appl. No.: 10/739,480

(22) Filed: Dec. 18, 2003

(65) Prior Publication Data

US 2005/0135583 A1    Jun. 23, 2005

(51) Int. Cl.
H04M 3/42    (2006.01)
H04M 1/56    (2006.01)
H04M 15/06    (2006.01)

(52) U.S. Cl. .......................... 379/202.01; 379/142.01; 379/207.12

(58) Field of Classification Search ........... 379/142.01, 379/142.05, 142.1, 142.17, 202.01, 203.01, 379/204.01, 205.01, 207.01, 207.12; 370/260, 370/263; 709/204; 348/14.01, 14.08, 14.09
See application file for complete search history.

(56) References Cited

U.S. PATENT DOCUMENTS

| 5,450,481 | A | * | 9/1995 | Penzias ................. 379/202.01 |
| 5,821,984 | A | * | 10/1998 | Ito et al. ................. 348/14.09 |
| 6,304,648 | B1 | * | 10/2001 | Chang ................... 379/202.01 |
| 6,327,567 | B1 | * | 12/2001 | Willehadson et al. ....... 704/270 |
| 6,457,043 | B1 | * | 9/2002 | Kwak et al. ................ 709/204 |
| 6,826,159 | B1 | * | 11/2004 | Shaffer et al. .............. 370/260 |
| 2002/0085697 | A1 | * | 7/2002 | Simard et al. ......... 379/202.01 |
| 2002/0136382 | A1 | * | 9/2002 | Cohen et al. .......... 379/202.01 |
| 2003/0081751 | A1 | * | 5/2003 | Berstis .................. 379/202.01 |
| 2003/0231746 | A1 | * | 12/2003 | Hunter et al. ............. 379/88.01 |
| 2004/0100553 | A1 | * | 5/2004 | Allen et al. .............. 348/14.08 |

FOREIGN PATENT DOCUMENTS

EP    1 292 090    3/2003
FR    2 799 914    4/2001

OTHER PUBLICATIONS

Invitation to Pay Additional Fees dated Mar. 22, 2005 (3 pages); Communication Relating to The Results of the Partial International Search (1 page); Annex to Invitation to Pay Fees (1 page).
Notification of Transmittal of the International Search Report and the Written Opinion of the International Searching Authority or the Declaration mailed Aug. 24, 2005 (2 pages); International Search Report mailed Aug. 24, 2005 (5 pages); and Written Opinion of the International Searching Authority mailed on Aug. 24, 2005 (7 pages).

(Continued)

*Primary Examiner*—Quoc Tran
(74) *Attorney, Agent, or Firm*—Fish & Richardson P.C.

(57) ABSTRACT

Systems and techniqes for identifying a participant in a teleconference allow other participants at remote locations to be informed of the identify of a current speaker. A currently speaking participant is identified in a teleconference conducted using a connection on a circuit-switched network, and a signal indicating an identifier of the currently speaking participant is transmitted over the connection on the circuit-switched network. The signal is received, and the identifier of the currently speaking participant is displayed at a participating location. The displayed identifier is determined based on the indication in the signal.

27 Claims, 5 Drawing Sheets

OTHER PUBLICATIONS

Notification Concerning Transmittal of Copy of International Preliminary Report on Patentability mailed Jun. 29, 2006 (1 page); International Preliminary Report on Patentability mailed Jun. 29, 2006 (1 page); and Written Opinion of the International Searching Authority mailed on Jun. 29, 2006 (7 pages).

* cited by examiner

SPEAKER IDENTIFICATION DURING TELEPHONE CONFERENCING

TECHNICAL FIELD

This description relates to speaker identification during telephone conferencing, and more particularly to determining and displaying the identity of a speaker participating in a telephone conference.

BACKGROUND

Telephone conferences are frequently used to enable people in distinct locations to communicate. Participants are typically located in two or more locations, with each location having one or more participants. When the number of participants in a telephone conference exceeds a small number, it becomes difficult for the participants in the call to determine who is speaking at any given moment. Video conferences also allow multiple participants to communicate from two or more different locations. Depending on the clarity of the video image and the direction in which the video camera is aimed, the video image may provide some assistance in identifying the speaker, but, in some cases, the speaker's identity may be difficult to determine.

SUMMARY

Techniques are described for determining and displaying the identity of a current speaker in a teleconference to other participants in the teleconference. Data used for identifying the current speaker is transmitted among locations that are participating in the teleconference using a connection on a circuit-switched network that is also used for carrying voice signals for the teleconference.

In one general aspect, a currently speaking participant is identified in a teleconference conducted using a connection on a circuit-switched network. A signal indicating an identifier of the currently speaking participant is transmitted over the connection on the circuit-switched network. The signal is received, and the identifier of the currently speaking participant is displayed at a participating location. The displayed identifier is determined based on the indication in the signal.

Implementations may include one or more of the following features. For example, one or more participants in the teleconference may be identified, identifies of the participants may be stored, and the identifier of one or more of the participants may be sent to the participating location prior to transmitting the signal. The one or more participants may be identified by reading a unique identifier for the one or more participants from a card, by receiving a unique identifier entered with a keypad, or by recognizing a voice sample provided by at least one of the participants. A voiceprint for the one or more participants may be stored, and the currently speaking participant may be identified by comparing speech from the currently speaking participant to the stored voiceprint. An identifier of a participant in the teleconference may be received, and the identifier may be stored in a list of participants. Identifying the currently speaking participant may involve identifying a location of the participant, and transmitting the signal including the identifier of the currently speaking participant may involve transmitting an identifier of the location.

A signal may be received that includes an indication of an identifier of a currently speaking participant in the teleconference. The identifier may be retrieved using the indication, and the accessed identifier of the speaking participant may be displayed. The identifier may be accessed from a list of participants. The currently speaking participant may be identified by comparing a live voice signal of the currently speaking participant to a set of stored voice signals, identifying a stored voice signal from the set of stored voice signals that matches the live voice signal, and accessing an indication of an identifier associated with the identified stored voice signal. The indication may be included in the transmitted signal. The currently speaking participant may alternatively be identified by detecting an action, such as pressing a button, performed by the currently speaking participant to indicate that the currently speaking participant is speaking. In another alternative, the currently speaking participant may be identified by detecting a period of uninterrupted speech by the participant.

A period of silence from the participant may be detected. In response to the detected period of silence, a determination may be made that the participant has stopped speaking, and a signal indicating that the participant has stopped speaking may be transmitted. A signal indicating that the participant has stopped speaking may be received, and the identifier of the participant may be removed from a display in response to the received signal indicating that the participant has stopped speaking. The signal may be received by a central controller or at the participating location.

The speaking participant may be identified by a voice recognition module, and a communications module may be used to send a signal indicating the speaking participant. A display may be used to display an identifier of one or more participants in the teleconference that is speaking. A memory may store an identifier of the speaking participant. The speaking participant may be one of multiple participants at a participating location, and the memory may store identifiers of the multiple participants. The communications module may receive identifiers of participants at other locations to be stored by the memory and may transmit the identifiers of the multiple participants. The memory may store a voiceprint of one or more participants in the teleconference, and the voice recognition module may compare the stored voiceprint with a live voice signal from the speaking participant to determine if the participant corresponding to the stored voiceprint is speaking. The communications module may receive a signal that an individual at another location is speaking, and an identity of the location at which the individual is speaking may be displayed. A card reader may read information stored on a card that identifies the participant in the teleconference. A keypad may receive a code that uniquely identifies the participant in the teleconference. A button, when pressed, may be used to indicate to the voice recognition module that the participant is speaking.

The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

A device that automatically identifies a speaker during a telephone conference (i.e., teleconference) and displays the identity of the speaker to the other participants in the telephone conference may be used to permit the other participants to identify the speaker so as to improve the efficiency and effectiveness of a teleconference. The device may be a part of or connected to a phone or other communications system used to participate in the telephone conference. The device identifies the speaker that is using the communications system. The identification may occur through voice recognition or as a result of an action performed by the speaker (e.g., pushing a "current speaker" button). The speaker may register with the device before the teleconference begins. The device sends information identifying the speaker to other devices at other locations participating in the teleconference. The other devices display the identifying information until an indication is received that the speaker has stopped speaking (e.g., based on a predetermined period of silence, receiving an identification of another speaker, or as a result of the current speaker pressing or releasing a button indicating that he is done speaking).

Figure 1:
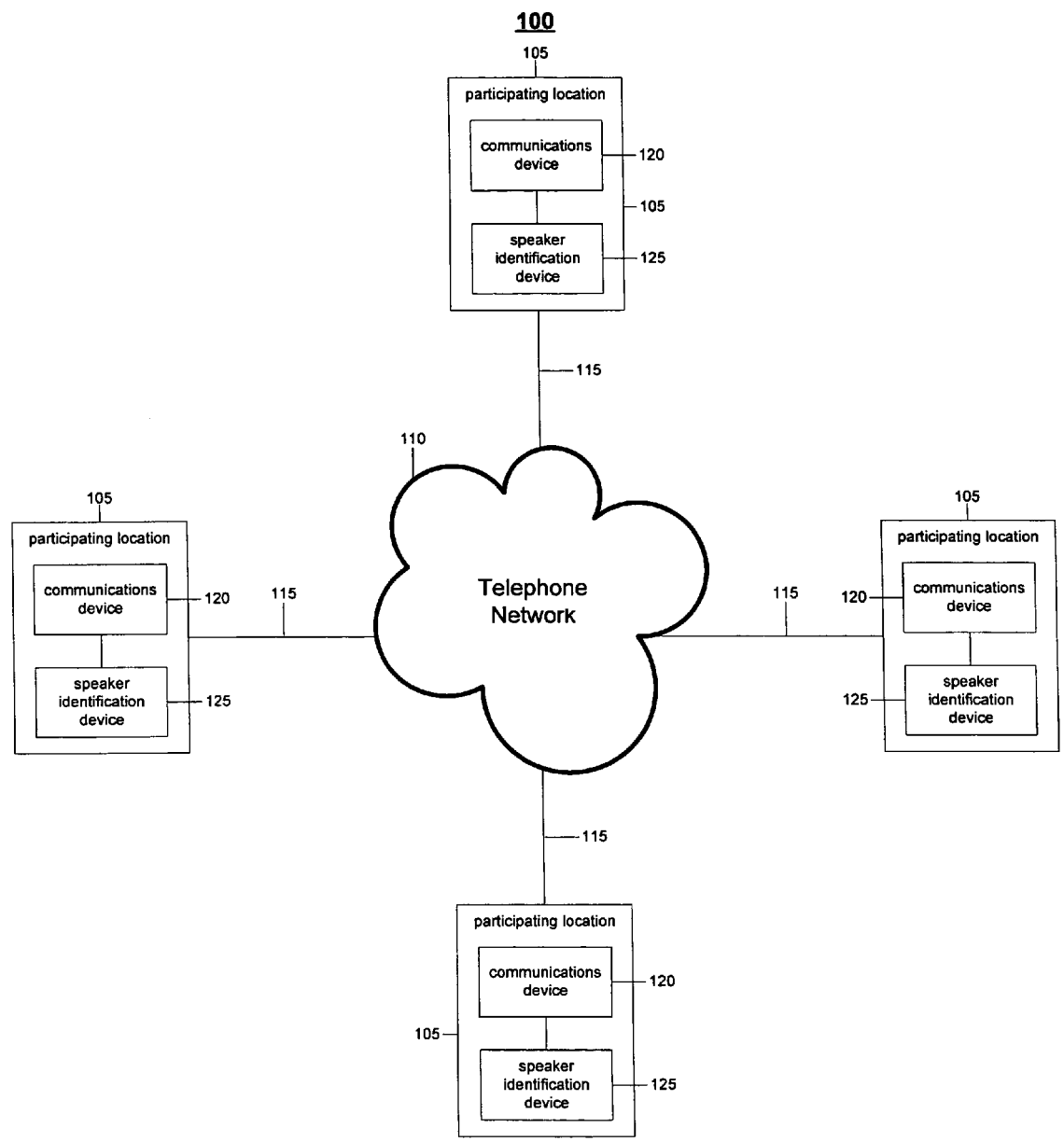
FIG. 1 is a block diagram of a telephone network over which a telephone conference may occur.

FIG. 1 depicts a telephone network 100 for supporting teleconferences. One or more participants in the teleconference may be located at each of any number of participating locations 105. The participating locations 105 are connected by an ordinary telephone network 110. The telephone network may include any analog, digital, wireline, and/or wireless telephone network. For example, the telephone network may include a Public Switched Telephone Network (PSTN), a satellite-based phone network, and/or a cellular telephone network. Each of the participating locations 105 is connected to the telephone network 110 through a communications link 115, which may be any wired or wireless connection to the telephone network 110. For example, the communications link 115 may be a wired telephone line, a wireless connection to a cellular phone repeater, or a wireless connection to a satellite. In general, each participating location 105 communicates over the communications link 115 using an ordinary telephone connection, such as an analog telephone line and/or a circuit switched network. The participating locations 105 therefore do not require significant processing resources, support for complex communication protocols, or access to packet-switched networks.

Each of the participating locations includes a communications device 120 and a speaker identification device 125 that is connected to or otherwise coupled to the communications device 120. The communications device 120 may be, for example, a wired telephone, a speakerphone, a cellular phone, a videophone, a videoconferencing system, or a satellite phone. The speaker identification device 125 is operable to identify a speaker that is using the communications device 120 to which the speaker identification device 125 is connected. The speaker identification device 125 sends a signal including information identifying the speaker to other speaker identification devices 125 at other participating locations 105. The other speaker identification devices 125 receive and display the identifying information, such as by displaying the name and/or location of the speaker on an LCD screen or other user interface, which may be built into the communication device 120. When the speaker has stopped speaking, a second signal may be sent to the other speaker identification devices 125. Upon receipt of the second signal, the other speaker identification devices may stop displaying the identifying information of the speaker.

In another implementation, a speaker identification device 125 may determine when a speaker is using the communications device 120 to which the speaker identification device 125 is connected. The speaker identification device 125 sends a signal including information identifying the participating location 105 to the other speaker identification devices 125 at the other participating locations 105. The other speaker identification devices 125 receive the signal and display the identifying information. As a result, the participants in the teleconference at the corresponding participating locations 105 may see an identifier of the participating location 105 of the current speaker. When the speaker has stopped speaking, a second signal may be sent to the other speaker identification devices 125. Upon receipt of the second signal, the other speaker identification devices stop displaying the identifying information of the participating location 105 of the speaker.

A speaker identification device 125 also may register participants in a conference call at a corresponding participating location 105 before the conference call begins. Registering a participant may include capturing and storing an identity associated with the participant. After all of the participants are registered, a list of identities of the participants at the participating location 105 is sent to the other speaker identification devices 125 at the other participating locations 105 of the teleconference. The other speaker identification devices 125 store the list of participants so that the identities of all of the participants from all of the participating locations 105 are known by each speaker identification device 125 before the teleconference begins. Instead of sending full identifiers of a speaker, references to the list of participants may be sent so as to reduce the amount of information sent through the telephone network 110 during the teleconference. Additional participants may be added to the list of participants at a participating location 105 after the call has begun.

In one implementation, the signals sent between the speaker identification devices 125 include tones corresponding to or analogous to the tones generated by a standard touch-tone keypad. For example, each participating location 105 and/or each participant at a participating location 105 may be assigned a two-digit identifier. The identifiers may be sent between the speaker identification devices 125 with the lists of identities of participants sent from each of the participating locations 105. Thus, for example, a signal indicating that a participant has started speaking may include the two-digit identifier of the participant's location 105, the two-digit identifier of the participant, and a one digit identifier indicating that the participant has started speaking. Similarly, a signal indicating that a participant has stopped speaking may include the two-digit identifier of the participant's location 105, the two-digit identifier of the participant, and a one digit identifier indicating that the participant has stopped speaking. The digits in the signals may be sent over the telephone network 105 as tones, so the signals may be audible to the participants in the telephone conference.

Alternatively, the signals may be filtered at each participating location 105 to prevent the tones from interfering with the discussion.

Figure 2:
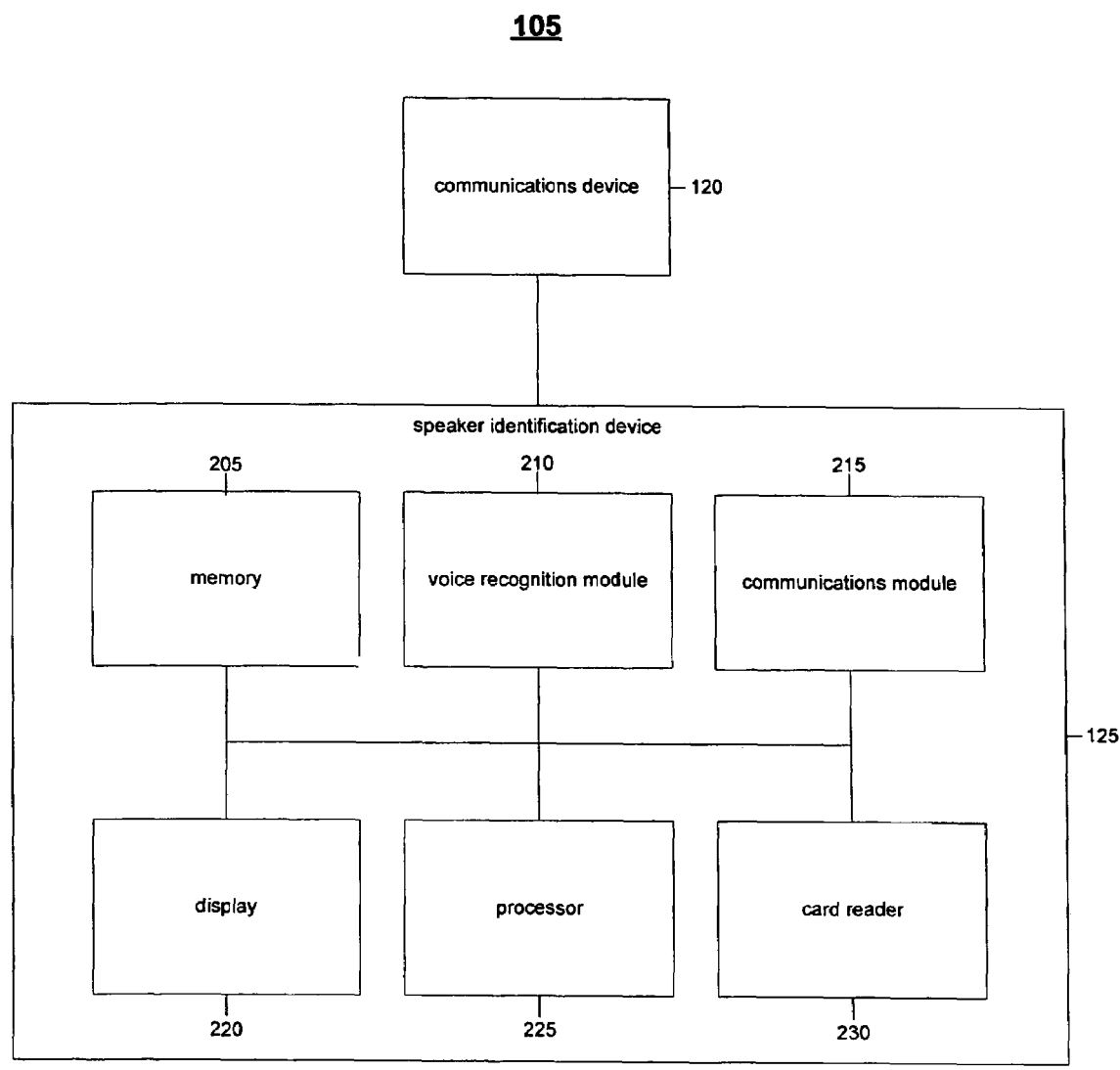
FIG. 2 is a block diagram of a device for identifying a speaker in a telephone conference.

FIG. 2 is a block diagram of an exemplary participating location 105. As discussed above, a teleconference may involve two or more participating locations 105. Each participating location 105 includes a communications device 120, which may be used by participants in the teleconference at the participating location 105 to communicate with participants in the teleconference at other participating locations 105. Each participating location also includes a speaker identification device 125 that is used to identify and display an identity of a participant that is speaking during the teleconference.

In the implementation shown in FIG. 2, the speaker identification device 125 includes a memory 205, a voice recognition module 210, a communications module 215, a display 220, a processor 225, and a card reader 230. The memory 205 stores a list of identifiers for all of the participants from all of the participating locations 105 of the teleconference. The participant list is stored in the memory 205 so that the identifiers do not need to be passed through the telephone network during the teleconference, thus reducing the amount of speaker identification information that is sent over the telephone network during the teleconference. Instead, a key that indexes an entry within the list of participants is sent over the network, and the entry from the list, which is an identifier of the current speaker, is displayed to identify the current speaker.

The memory 205 also may store a voiceprint for each of the participants in the teleconference at all of the participating locations 105 or at the participating location 105. A voiceprint is a set of speech characteristics for a particular individual or other data from which a current speaker can be automatically and uniquely identified. The voice recognition module 210 may access the stored voiceprints when it is determined that a participant is using the communications device 120. The voice recognition module 210 compares the live speech from the communications device 120 to the stored voice prints to identify the stored voice print that most closely matches the live speech and thus to identify the participant using the communications device 120.

In another implementation, the voice recognition module 210 is configured to recognize an action identifying the participant using the communications device 120. For example, the voice recognition module 210 may recognize when the participant presses a button or a sequence of buttons that identifies the participant as using the communications device 120. When the voice recognition module 210 recognizes an action corresponding to a particular participant, the voice recognition module 210 determines that the particular participant is speaking.

In yet another implementation, the voice recognition module 210 may be configured to receive an identifier or other data sent from a microphone corresponding to a participant when the participant speaks above a threshold volume into the microphone. When the voice recognition module 210 receives the identifier or other data sent from the microphone, the voice recognition module determines that the participant is the current speaker.

The communications module 215 sends at least one identifier of the speaking participant to other speaker identification devices 125 at other participating locations 105. The communications module 215 may be any module capable of sending and receiving signals over the telephone network.

Alternatively or additionally, the voice recognition module 210 may simply recognize when a participant is using the communications device 120 without using voiceprints or other indications to uniquely determine the specific participant that is speaking. In such a case, the communications module 215 sends an identifier of the participating location 105 for the speaking participant to other speaker identification devices 125 at other participating locations 105.

The communications module 215 also receives signals from other speaker identification modules 125 that identify a current speaker or a location of the current speaker. In one implementation, the signal may include an identifier of the current speaker and/or the location of the current speaker. In another implementation, the signal may include a key that can be used to access an identifier of the speaker from the list of participants stored in the memory 205. The display 220 displays the identifier from the signal or from the list of participants. The display 220 may be a single line display that displays an identifier of the current or most recent speaking participant or a larger display, such as a television, a computer monitor, or a projector, that simultaneously displays all participants in the teleconference along with a location and other participant-specific information and an indication of the current speaker. The display 220 also may indicate that there are multiple active speakers when multiple participants are speaking at the same time.

In one implementation, the speaker identification device includes a card reader 230. The card reader may be used to register participants at the participating location 105. Each of the participants may have a card on which a unique identifier is encoded, such as, for example, a credit card. The card reader 230 reads the encoded identifier to identify the participant that entered the card into the card reader 230. The speaker identification device 125 may search for a voice print in the memory 205 corresponding to the encoded identifier. If the voice print is not found, then the participant may be prompted to provide one.

The speaker identification device 125 also includes a processor 225 operable to control and coordinate the operation of the memory 205, the voice recognition module 210, the communications module 215, the display 220, and the card reader 230 to identify and display speakers to the participants in the teleconference.

Figure 3:
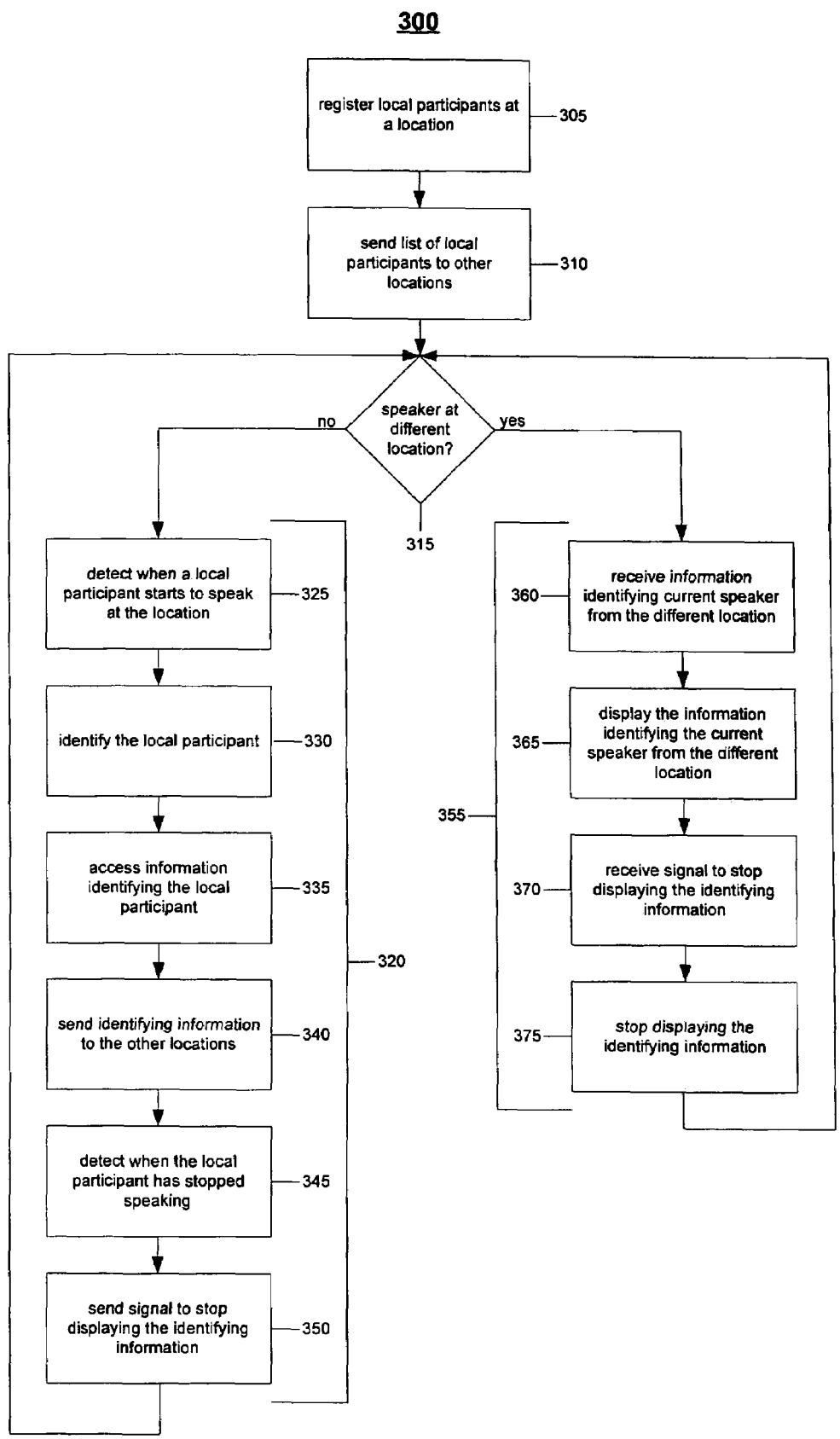
FIG. 3 is a flow chart of a process for identifying and displaying the identity of speakers in a telephone conference.

FIG. 3 is a flow chart of a speaker identification process 300 that is executed by a speaker identification device at each participating location to identify and display an identification of a current speaker in a telephone conference. The process 300 includes registering participants at a participating location (step 305). After all of the participants at the participating location have registered with the speaker identification device, a list of participants is sent to other speaker identification devices corresponding to other participating locations of the teleconference (step 310). The list may be sent after establishing a connection between the various participating locations.

At this point, the teleconference is started (i.e., voice communications are permitted to begin), and a determination is made as to whether a participant is speaking at a different participating location (step 315). In some cases, step 310 may be performed concurrent with or after starting the teleconference. If a participant is not speaking at a different participating location, then a sub-process 320 is executed. The sub-process 320 detects when a participant at the local participating location has started and stopped speaking and instructs the other participating locations to display an identification of the participant. Specifically, the speaker identification device detects when a local participant starts to speak (step 325). The detection of a local participant starting to speak may occur immediately or after a few seconds of uninterrupted speech by the local participant. The local participant that is speaking is identified (step 330). In one implementation, identifying the local participant includes matching the participant's live speech from the communications device to a stored voice print of the participant's speech. In another implementation, identifying the local participant includes recognizing an action affirming that the local participant is speaking, such as a button press. In yet another implementation, identifying the local participant includes recognizing that the local participant is speaking without identifying the local participant. In such a case, the participating location of the local participant is identified as speaking without identifying the particular speaker.

The speaker identification device accesses information identifying the speaking participant or the location of the speaking participant (step 335). The information may be accessed from a list of participants in the teleconference. The identifying information is sent to the other locations participating in the teleconference (step 340). The speaker identification device then detects when the speaking participant stops speaking (step 345). In one implementation, detecting that the speaking participant has stopped speaking includes detecting several seconds of silence from the speaking participant alone or along with detecting another speaker. In another implementation, detecting that the speaking participant has stopped speaking includes recognizing an action affirming that the local participant has stopped speaking, such as a press or a release of a button. Once a speaker has stopped speaking, a signal is sent to the other locations participating in the teleconference to indicate that the other locations should stop displaying the identifying information for the participant who has stopped speaking (step 350), thus completing the sub-process 320.

In another implementation, instead of detecting when the participant starts (step 325) and stops speaking (step 345), a determination may be made that the participant is speaking. In such an implementation, repeated signals that the participant is speaking are sent to the other participating locations until the participant stops speaking, at which point signals that the participant is speaking are no longer sent. The other locations display an identifier of the speaking participant as long as the signals are received, and when the signals are no longer received, the identifier is no longer displayed.

If a determination is made that a person at a different location is speaking (step 315), then a sub-process 355 is executed. The sub-process 355 receives information identifying the speaker at the different location and displays the information while the speaker at the different location continues to speak. Specifically, the speaker identification device receives information identifying a current speaker from a different location (step 360). The identifying information is sent from the different location when the current speaker starts to speak. The identifying information may include an identifier of the current speaker. The identifying information is displayed for the participants at the local participating location to see who is currently speaking (step 365). The information is displayed until a signal to stop displaying the identifying information is received (step 370). Such a signal is sent from the different location when the current speaker stops speaking. After the stop signal is received, the local speaker information device stops displaying the identifying information (step 375), thus completing the sub-process 355.

The sub-processes 320 and 355 are not mutually exclusive in that both may run simultaneously. In addition, the sub-processes 320 and 355 may be performed in any order. Moreover, the sub-processes 320 and 355 may be repeated any number of times. Furthermore, participants at two participating locations may be speaking at the same time, in which case the sub-processes 320 and 355 may be signaled to occur simultaneously. In other words, step 315 may be replaced by a step that simultaneously initiates sub-process 320 for each local participant that is speaking, if at least one of the local participants is a speaker, and sub-process 355 for each speaker at a different location, if at least one person is speaking at one or more different locations. As another alternative, a protocol may be used to preclude simultaneous execution of sub-processes 320 and 355 and to preclude multiple speaker identification devices from simultaneously sending signals identifying a current speaker.

Figure 4:
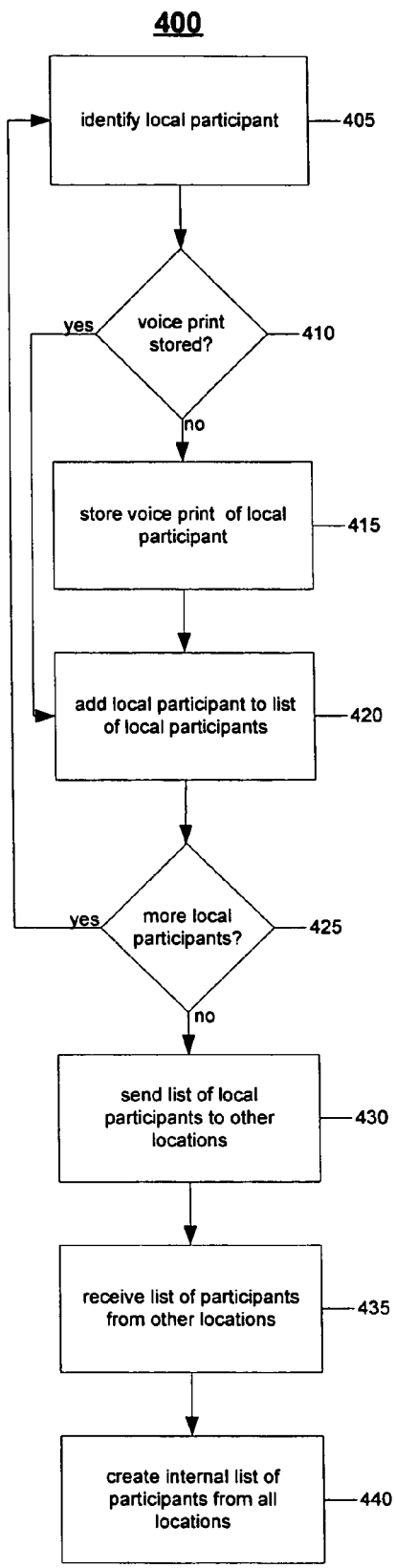
FIG. 4 is a flow chart of a process for registering participants in a telephone conference at a location.

FIG. 4 is a flow chart of a registration process 400 for registering participants at each participating location of a teleconference. The registration process 400 is run by a speaker identification device after a connection is established but before the teleconference begins (i.e., before voice communications begin) in order to reduce the amount of data sent over a telephone network during the teleconference. The registration process 400 also gathers information necessary to identify the participants during the teleconference.

The registration process 400 begins when a local participant is identified (step 405). In one implementation, the speaker identification device may identify a local participant by reading a name on a card, such as a credit card, with a card reader, and using the name as an identifier of the local participant. In another implementation, the speaker identification device may identify a local participant by receiving a unique identifying code or name from the participant. The code may be entered, for example, on a keypad of a communications device used during the teleconference. Assuming that a correspondence between the code and a name for the participant that entered the code has been established, the name corresponding to the entered code is used as an identifier for the participant. In another implementation, the local participant may be identified through a voice recognition process by comparing the participant's voice to a previously stored voice print. In another voice recognition implementation, the local participant speaks a name, and the spoken name is converted to text and used as an identifier of the local participant.

After the local participant is identified and an identifier for the participant is assigned, a determination is made as to whether a voiceprint has been stored for the local participant (step 410). The voiceprint is used by the speaker identification device to identify the local participant as a speaker at the participating location. If no voiceprint has been stored, then the speaker identification device prompts the user for a speech sample, receives the speech sample from the local participant, and stores a voiceprint derived from the speech sample (step 415). After the voiceprint is stored, or if a voiceprint was already stored, the local participant is added to a list of local participants for the participating location (step 420).

A determination is made as to whether there are more local participants at the participating location to register with the speaker identification service (step 425). If there are more local participants, then each local participant is identified (step 405), has a voice print stored if necessary (step 415), and is added to the list of local participants (step 420), until there are no more local participants to register. After all local participants have been registered, the list of local participants is sent to the other participating locations (step 430). Such a list is also received from each of the other participating locations (step 435), and the lists are combined to form an internal list of participants from all participating locations (step 440). At this point, the speaker identification device has access to all of the information needed to identify speakers and minimize the amount of information sent over the telephone network during a teleconference.

Figure 5:
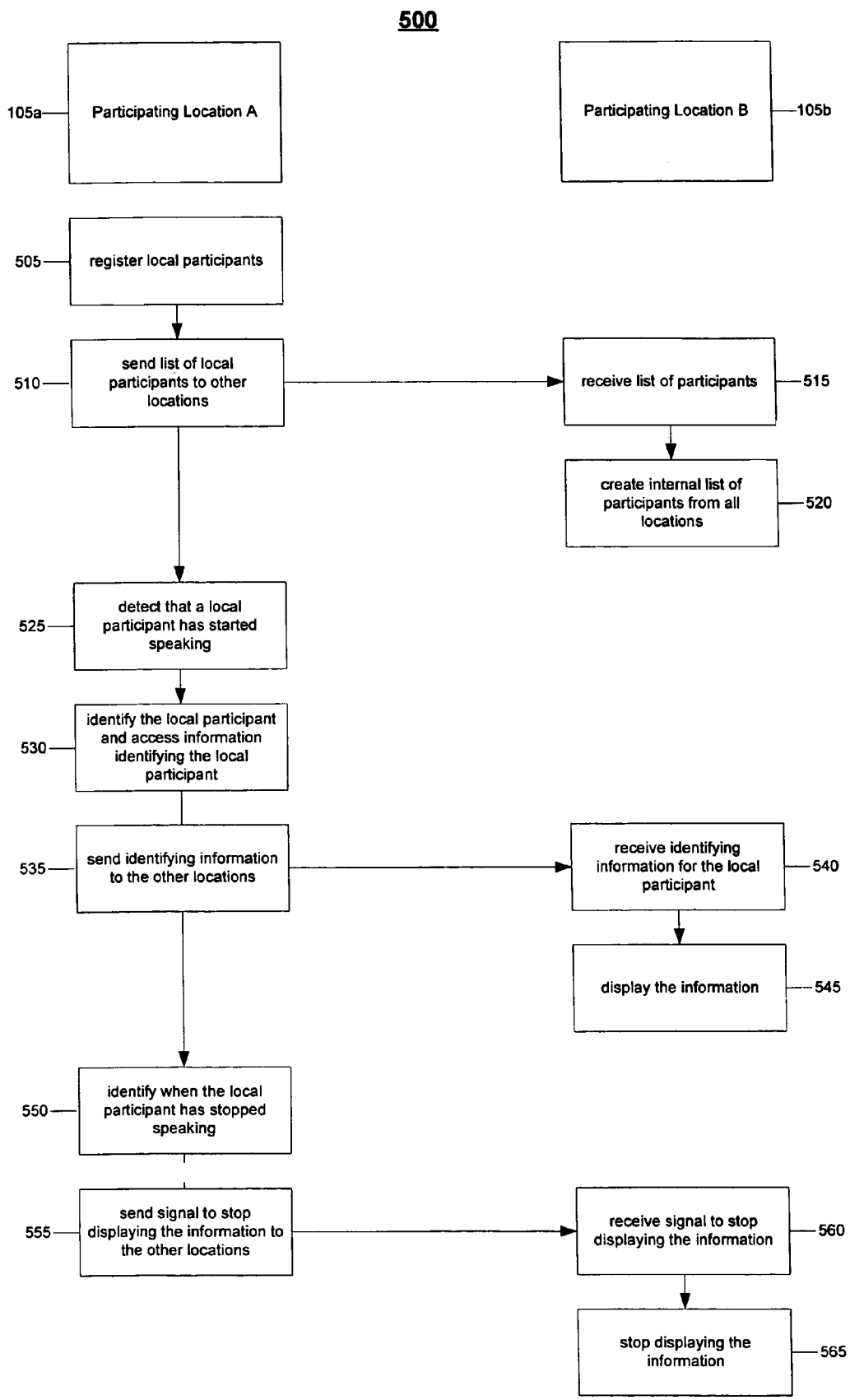
FIG. 5 is a flow chart of a process for identifying and displaying the identity of speakers in a telephone conference at two locations.

FIG. 5 is a flow diagram of a process 500 used to identify and display the identity of participants in a telephone conference at two participating locations, although the teleconference may involve any number of participating locations. The participating locations 105a and 105b first register local participants and then identify and display identifiers of local participants that are speaking during the teleconference.

The process 500 begins when a participating location, for example participating location A 105a, registers local participants in the teleconference at that location (step 505). The registration process may be the registration process 400 from FIG. 4. The registration process creates a list of local participants, and sends the list to other participating locations, including to participating location B 105b (step 510). The list may include an identification (e.g., name) of each participant along with a corresponding identifier code. The participating location B 105b receives the list of participants from the participating location A 105a, as well as from any other participating locations (step 515). The participating location B 105b combines all of the received lists to create a local list of the participants from all of the participating locations of the teleconference (step 520).

The process 500 includes having the location A 105a detect that a local participant has started speaking at the participating location A 105a (step 525). A speaker identification device at the participating location A 105a identifies the local participant that is speaking and accesses an identifier code of the local participant (step 530). The identifier code is sent to the other participating locations, including the participating location B 105b (step 535). The identifier code is received by the other participating locations, including the participating location B 105b (step 540). The participating location B 105b determines the identification that corresponds to the identifier code and displays the identification for the current speaker (step 545).

The participating location A 105a also detects when the speaking local participant has stopped speaking (step 550). The participating location A 105a sends a signal to stop displaying the identifier of the speaking local participant to the other participating locations, including the participating location B 105b (step 555). The signal is received by the other participating locations, including the participating location B 105b (step 560), and, as a result, the participating location B 105b stops displaying the identifier for the speaking local participant (step 565). The process of identifying and displaying the identity of a speaker (steps 525-565) may be repeated for each speaker during the teleconference.

The steps of the process 500 may be performed at both participating location A 105a and participating location B 105b, even though the process 500 is illustrated with location A 105a performing some of the steps and with location B 105b performing the other steps. In fact, both participating locations may perform each step simultaneously, but only one participating location 105a or 105b is shown performing each step for ease of illustration and discussion.

The implementations of a system for identifying and displaying identifiers of participants speaking during a teleconference described above include a speaker identification device associated with each of the participating locations. In another implementation, the functionality of the various speaker identification devices may be combined into a central teleconference controller. In such an implementation, each participating location includes a communications device and a display for displaying identifiers of the speakers of the teleconference, and the other parts of the speaker identification device (e.g., as shown and described in connection with FIG. 2) are included in the central teleconference controller. The central teleconference controller may be capable of identifying the current speaker from any participating location and distributing information to be displayed at the participating locations. The participants at the participating locations register with the central teleconference controller so that lists of participants at each participating location need not be distributed. In some implementations, however, the lists may be distributed to the participating locations to minimize the amount of information sent during the teleconference.

A number of implementations have been described. Nevertheless, it will be understood that various modifications may be made. For example, the steps of the described processes may be rearranged. Accordingly, other implementations are within the scope of the following claims.

What is claimed is:

1. A method for identifying a participant in a teleconference, the method comprising:
   receiving audio signals generated by a currently speaking participant of a plurality of participants, the plurality of participants participating in the conference call at a first location;
   identifying the currently speaking participant of the plurality of participants prior to transmitting the audio signals through a circuit-switched network; and
   directly transmitting, from the first location, a signal indicating an identifier of the currently speaking participant to different participants at one or more different locations through the circuit-switched network.

2. The method of claim 1 further comprising:
   storing an identifier of the currently speaking participant; and
   transmitting the identifier of the participant to the participating location prior to transmitting the signal.

3. The method of claim 2 wherein identifying the currently speaking participant comprises reading a unique identifier for the currently speaking participant from a card.

4. The method of claim 2 wherein identifying the currently speaking participant comprises receiving a unique identifier entered with a keypad.

5. The method of claim 2 wherein identifying the currently speaking participant comprises recognizing a voice sample provided by the at least one participant.

6. The method of claim 2 further comprising:
   storing a voiceprint for the currently speaking participant, wherein identifying the currently speaking participant comprises comparing speech from the currently speaking participant to the stored voiceprint.

7. The method of claim 1 further comprising:
   receiving an identifier of a participant in the teleconference; and
   storing the identifier in a list of participants.

8. The method of claim 1 wherein:
   identifying the currently speaking participant comprises identifying a location of the participant; and
   transmitting the signal including the identifier of the currently speaking participant comprises transmitting an identifier of the location.

9. The method of claim 1 further comprising:
receiving a signal including an indication of an identifier of a currently speaking participant in the teleconference;
accessing the identifier using the indication; and
displaying the accessed identifier of the speaking participant.

10. The method of claim 9 wherein accessing the identifier comprises accessing the identifier from a list of participants.

11. The method of claim 1 wherein identifying the currently speaking participant comprises:
comparing a live voice signal of the currently speaking participant to a set of stored voice signals;
identifying a stored voice signal from the set of stored voice signals that matches the live voice signal; and
accessing an indication of an identifier associated with the identified stored voice signal, wherein the indication is included in the transmitted signal.

12. The method of claim 1 wherein identifying the currently speaking participant comprises detecting an action performed by the currently speaking participant indicating that the currently speaking participant is speaking.

13. The method of claim 12 wherein the action includes pressing a button.

14. The method of claim 1 wherein identifying the currently speaking participant comprises detecting a period of uninterrupted speech by the participant.

15. The method of claim 1 further comprising:
detecting a period of silence from the participant;
determining that the participant has stopped speaking in response to the detected period of silence; and
transmitting a signal indicating that the participant has stopped speaking.

16. The method of claim 15 further comprising:
receiving a signal indicating that the participant has stopped speaking; and
removing the identifier of the participant from a display in response to the received signal indicating that the participant has stopped speaking.

17. The method of claim 1 wherein the signal is received by a central controller.

18. The method of claim 1 wherein the signal is received at the participating location.

19. A system for identifying a speaker participating in a conference call, the system comprising:
a voice recognition module operable to receive audio signals generated by a currently speaking participant of a plurality of participants and identify the currently speaking participant of the plurality of participants prior to transmitting the audio signals through a circuit-switched network, the plurality of participants participating in a teleconference at a first location; and
a communications module operable to directly send, from the first location, a signal indicating the speaking participant to different participants at one or more different locations, wherein:
the teleconference occurs over a circuit-switched connection, and
the signal is sent over the same circuit-switched connection used for voice communications in the teleconference.

20. The system of claim 19 further comprising a display operable to display an identifier of the speaking participant in the teleconference.

21. The system of claim 19 further comprising a memory operable to store an identifier of the speaking participant, wherein the signal includes an indication of the stored identifier.

22. The system of claim 21 wherein:
the speaking participant is one of multiple participants at a participating location;
the memory stores identifiers of the multiple participants;
the communications module is operable to receive identifiers of participants at other locations to be stored by the memory; and
the communications module is operable to transmit the identifiers of the multiple participants.

23. The system of claim 21 wherein:
the memory is operable to store a voiceprint of the speaking participant in the teleconference; and
the voice recognition module is operable to compare the stored voiceprint with a live voice signal from the speaking participant to determine if the participant corresponding to the stored voiceprint is speaking.

24. The system of claim 19 wherein the communications module is operable to receive a signal that an individual at another location is speaking, the system further comprising a display operable to display an identity of the location at which the individual is speaking.

25. The system of claim 19 further comprising a card reader operable to read information stored on a card that identifies the participant in the teleconference.

26. The system of claim 19 further comprising a keypad operable to receive a code that uniquely identifies the participant in the teleconference.

27. The system of claim 19 further comprising a button operable, when pressed to indicate to the voice recognition module that the participant is speaking.

* * * * *